United States Patent
Koslow

[11] 3,803,962
[45] Apr. 16, 1974

[54] CUT-TO-LENGTH MACHINE

[76] Inventor: George Koslow, 149 Church St., New York, N.Y. 10007

[22] Filed: June 23, 1972

[21] Appl. No.: 265,701

[52] U.S. Cl.................... 83/110, 83/293, 83/335, 83/524
[51] Int. Cl..................... B23d 25/02, B26d 5/22
[58] Field of Search ............ 83/335, 334, 324, 369, 83/285, 293, 295, 109, 110, 524

[56] References Cited
UNITED STATES PATENTS

| | | | |
|---|---|---|---|
| 3,628,410 | 12/1971 | Shields | 83/335 X |
| 1,479,812 | 1/1924 | Holt | 83/335 X |
| 2,045,928 | 6/1936 | Rubin | 83/293 |
| 3,272,043 | 9/1966 | Ryan | 83/335 X |
| 1,887,952 | 11/1932 | Harney | 83/324 X |

Primary Examiner—Roy Lake
Assistant Examiner—James F. Coan

[57] ABSTRACT

A machine for cutting predetermined lengths of material. The material is fed through a cutting die by friction rollers which are coupled to a first gear train to a clutch operating mechanism. A second gear train operates a cutoff knife through the driven gear of the clutch. The cutoff knife moves with the material so there is no jamming.

9 Claims, 2 Drawing Figures

PATENTED APR 16 1974 3,803,962

CUT-TO-LENGTH MACHINE

BACKGROUND OF THE INVENTION

Currently used equipment consists of a knife rotating in the plane of cut, with no provision for traveling with work, such as extruding plastic, during cutting, no provision for cutting shaped ends, and low accuracy and great complexity on cutting long lengths. Traveling saws are also used for cut-off.

Cutter, as used herein includes all known rotary type cutters such as rotary cutting die, rotary male-female die, and all reciprocating traveling types such as overlapping shear, male-female die, cutting or steel-rule die and rocking cutting die. Cutting includes applications such as punching, notching, forming, marking, embossing, and hot stamping.

Clutch as used herein includes all variations such as mechanical, electric, pneumatic, hydraulic, positive or friction, magnetic particle, multiple jaw and, single pin.

SUMMARY

Briefly, the machine of the invention consists of a traveling rotary or reciprocating cutter or die cutter, driven intermittently through a single cycle clutch system triggered by a measuring wheel or other measuring means. Improvements are provided in cutter design and in measurement, that result in reduced cost, greater accuracy on long lengths and greater simplicity and reliability. And, the invention provides a unique feature, an intermittent kicker that increases the velocity of the discharges cut length, so that the on-coming web will clear and pass over the completed length.

This invention can also be used for cutting shaped ends, or performing other operations such as notching, punching, marking, embossing, and forming.

DESCRIPTION OF SPECIFIC EMBODIMENTS

Figure 1:
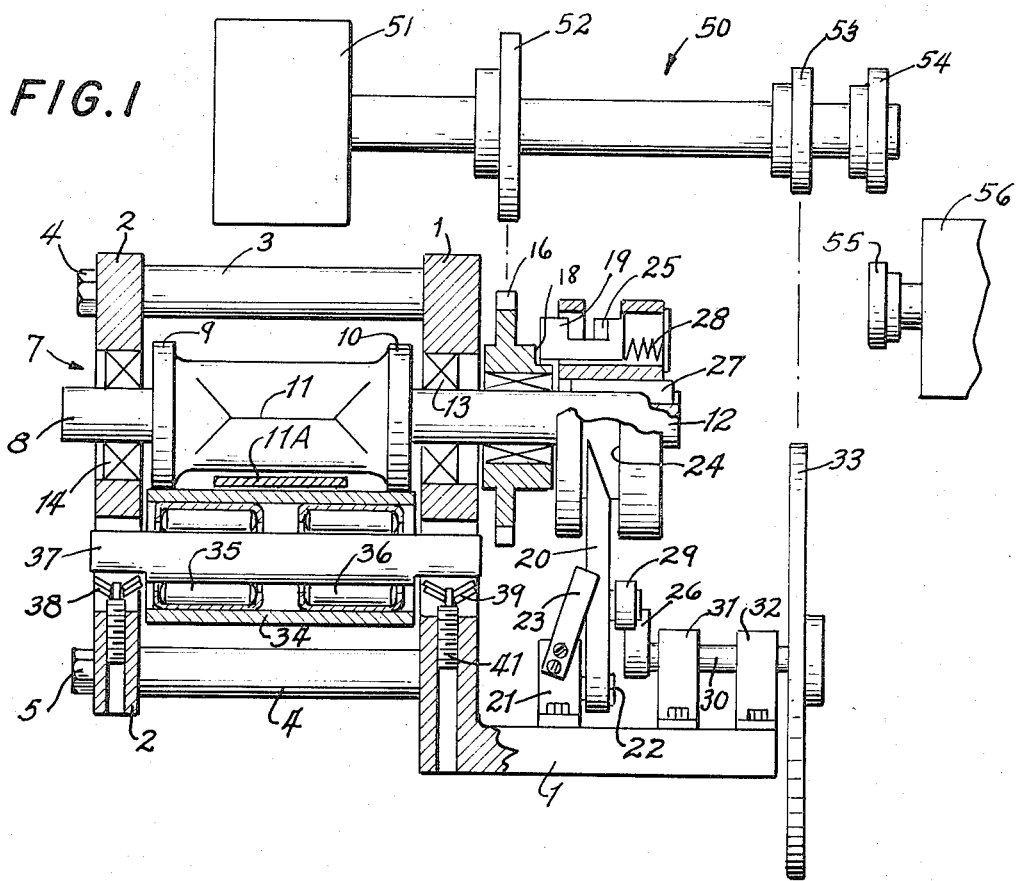
FIG. 1 is a view from the entry end.

FIG. 1 comprises an angle shaped frame 1, a bearing plate 2, spaced from said frame by hollow tubular spacers 3 and 4, and held together by bolts 5 and 6 inside said spacers and threaded into said frame 1. A cylindrical cutting die 7, comprising shaft 8, bearers 9 and 10, cutting blade 11 having a diameter the same as bearers 9 and 10, and shaft 12, is supported in frame 1 and bearing plate 2 by bearings 13 and 14. Clutch assembly 15 is keyed to shaft 12 by key 27 and fixed with set screws. A sprocket wheel 16, mounted on bearing 17 is freely supported on shaft 12. Said sprocket 16 has a recess 18 to receive clutch dog 19, the latter being urged by spring 28. A clutch dog retraction lever 20 is pivotally supported on bracket 21 by means of shoulder bolt 22, said lever 20 being held in clutch groove 24 by flat spring 23, said lever having a wedge point that, upon rotation of the clutch, engages a notch 25 in dog 19, causing dog 19 to retract into the clutch body and out of engagement with notch 18 in sprocket 16. The clutch dog 19 is released for engagement with sprocket 16 when lever 20 is pushed out of the clutch groove 24 and the dog notch 25 by cam 26 acting on projection 29 fastened to lever 20. Cam 26 is mounted on shaft 30 supported in pillow block s 31 and 32, and rotated by sprocket wheel 33. A platen roll comprising tube 34, mounted on bearings 35 and 36 that rotate freely on stationary shaft 37, is held pressed against die bearers 9 and 10 by cone springs 38 and 39, said springs being held in place and preloaded by set screws 40 and 41. The cutting edges 11 and the clutch assembly are positioned in the drawing for clarity. However, in operation, the two are phased so that the cutting edges will stop in a position that is clear of the work 11a.

Figure 2:
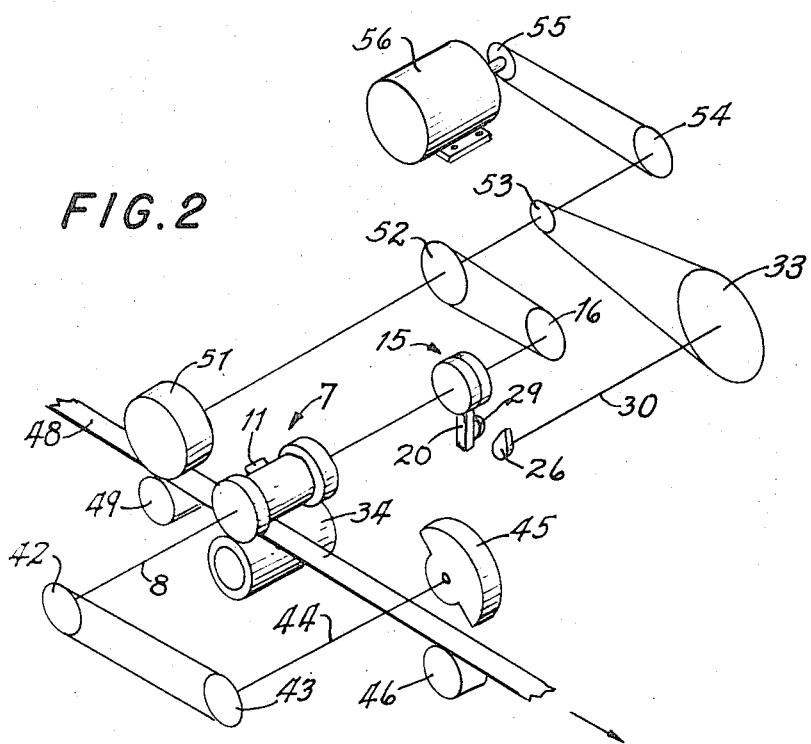
FIG. 2 shows the drive train in diagramatic form.

The shaft assembly 50 at the top of FIG. 1 shows how the cutter and measuring assembly might be driven from a puller roll drive system which is not a part of this invention. In the embodiments shown, measuring is accomplished by counting the revolutions and fractions of revolutions of the pull roll 51 through cam drive means 53 and 33. FIG. 2 shows the same embodiment in diagramatic form. The pull roll drive shaft 50 drives pull roll 51, clutch 15 through sprocket wheels 52 and 16, and sprocket wheels 33 through sprocket wheel 53. Shaft 50 is driven by motor 56 through pulleys 54 and 55. Die shaft 8 drives semi-cylindrical kicker roll 45 through sprocket wheels 42, 43 and shaft 44. The optional kicker roll 45 clamps the work 48 against idler roll 46 after cutter assembly has rotated enough to sever a length. Due to greater circumference or ratio of sprockets, said kicker roll 45 accelerates the severed strip. It also helps complete separation of the cut lengths on difficult to sever tough materials such as extruded plastics. Roll 49 is a pressure roll that clamps the work 48 against the pull roll 51.

In FIG. 1, the shape of the cutting blade 11 shown is suitable for cutting and chamfering. Any other desired cutting pattern may be used. Any driving means such as gears, belts or other means may be used in place of the roller chain and sprockets shown.

The machine of the invention uses an old principle, the rotary die, in new and improved ways. The use of friction drive for the platen roll 34 eliminates gears and reduces inertia. The use of a hollow platen roll with internal bearings further reduces inertia. This aids rapid starting and stopping of the die each time a cut is called for. Another unique improvement that provides surprising accuracy, is an all mechanical measuring system using a positive no-slip pin clutch. Repeat accuracies of 1/16 inch in 168 inches are common. Another unique optional feature is the intermittant kicker that improves separation and increases the velocity of the cut lengths after they are cut or scored by the cutter.

The rotary die is driven, through the clutch, at approximately the same surface speed as the speed of the material being driven by the pull roll. A cam, driven through means such as gears, sprockets, belts or other means, counts the revolutions or fraction of revolution of the pull roll, and trips the clutch every time the desired length has been measured and fed, as determined by the ratios selected in the drive system. An example actually used with great success comprises a pull roll with a 2' circumference, a die with a 6" circumference, and a 4 : 1 ratio of the pull roll to the die, with a 1:7 ratio on the pull roll to cam. This rotated the cam once for every 7 revolutions of the pull roll and produced 14' lengths. 1:5 produced 10' and 1:6 produced 12' lengths of extruded plastic profiles with shaped ends. More versatility at the expense of reliability can be obtained by using a friction clutch, triger-the clutch for one cycle, through an an electric counting means or by means of a variable speed drive operating a cam.

The cam can trip the clutch mechanically, or through a switch, air valve, hydraulic valve, fluidic sensor, or other sensing means that can drive a clutch cycling means. The die can have several sets of blades around its circumference, and be cycled a portion of a revolution.

I claim:

1. A machine for cutting a web of material into predetermined lengths comprising:
   a. feeding rollers for advancing the web longitudinally;
   b. means to measure the travel of the web;
   c. a cutter assembly including a cutter roller provided with a knife positioned above the web;
   d. a platen roller underneath the web;
   e. a mechanical clutch for engaging the cutter roller to turn it and apply the knife to the web to cut it after a predetermined length of web has passed the measuring means; and
   f. means for engaging the clutch including a key resiliently stressed to couple the cutter roller to a rotary power source, and an adjustable member to disable the key and disconnect the power source from the cutter roller.

2. A machine according to claim 1 in which the platen roller is free running.

3. A machine according to claim 1 wherein the means to measure the travel of the web includes an array of mechanically coupled gears.

4. A machine according to claim 1 wherein said cutter roller includes a knife secured to the roller and two flanges at either end of the roller for bearing on the platen roller.

5. A machine according to claim 1 wherein the platen roller includes a cylindrical shell rotatably mounted on roller bearings.

6. A machine according to claim 5 wherein the platen roller is forced into frictional engagement with two flanges on the cutter roller by two springs.

7. A machine according to claim 1 wherein said key engages a keyway in a gear wheel coupled to the power source when said member is actuated.

8. A machine according to claim 1 wherein said adjustable member is operated by a cam driven by the rotary power source to engage the clutch and turn the cutter roller one revolution.

9. A machine according to claim 1 wherein a semi-cylindrical kicker roll engages the web after being cut and moves the severed piece away from the uncut web.

* * * * *